United States Patent [19]
Myers, Sr.

[11] 3,930,424
[45] Jan. 6, 1976

[54] MULTI-SHELL LIMITED SLIP DIFFERENTIAL

[75] Inventor: Albert F. Myers, Sr., Warren, Mich.

[73] Assignee: Aspro, Inc., Westport, Conn.

[22] Filed: Oct. 29, 1974

[21] Appl. No.: 518,880

[52] U.S. Cl. ............................................. 74/711
[51] Int. Cl.² ......................................... F16H 1/44
[58] Field of Search ........................... 74/710.5, 711

[56] References Cited
UNITED STATES PATENTS

| | | | |
|---|---|---|---|
| 1,481,889 | 1/1924 | Carhart | 74/711 X |
| 2,463,091 | 3/1949 | Dortort | 74/711 |
| 3,327,564 | 6/1967 | Tharpe | 74/711 |

*Primary Examiner*—Samuel Scott
*Assistant Examiner*—John Reep
*Attorney, Agent, or Firm*—Lawrence E. Laubscher

[57] ABSTRACT

A self-loading limited slip differential is disclosed including at least two concentric layers of pairs of generally semi-spherical shells for applying friction torque bias to the driven shafts via the side and planetary gears of the differential gearing assembly. The shells of one layer are rotatably mounted on the planetary pinion shafts, respectively, and the shells of the other layer are non-rotatably connected with the driven shafts, respectively, said shells being compressed together as the side and planetary pinion gears are displaced apart upon the application of torque to the differential casing. In an alternate embodiment, in order to increase the friction torque bias, an additional pair of concentric layers of shell pairs are mounted concentrically upon the first two shell layers.

8 Claims, 5 Drawing Figures

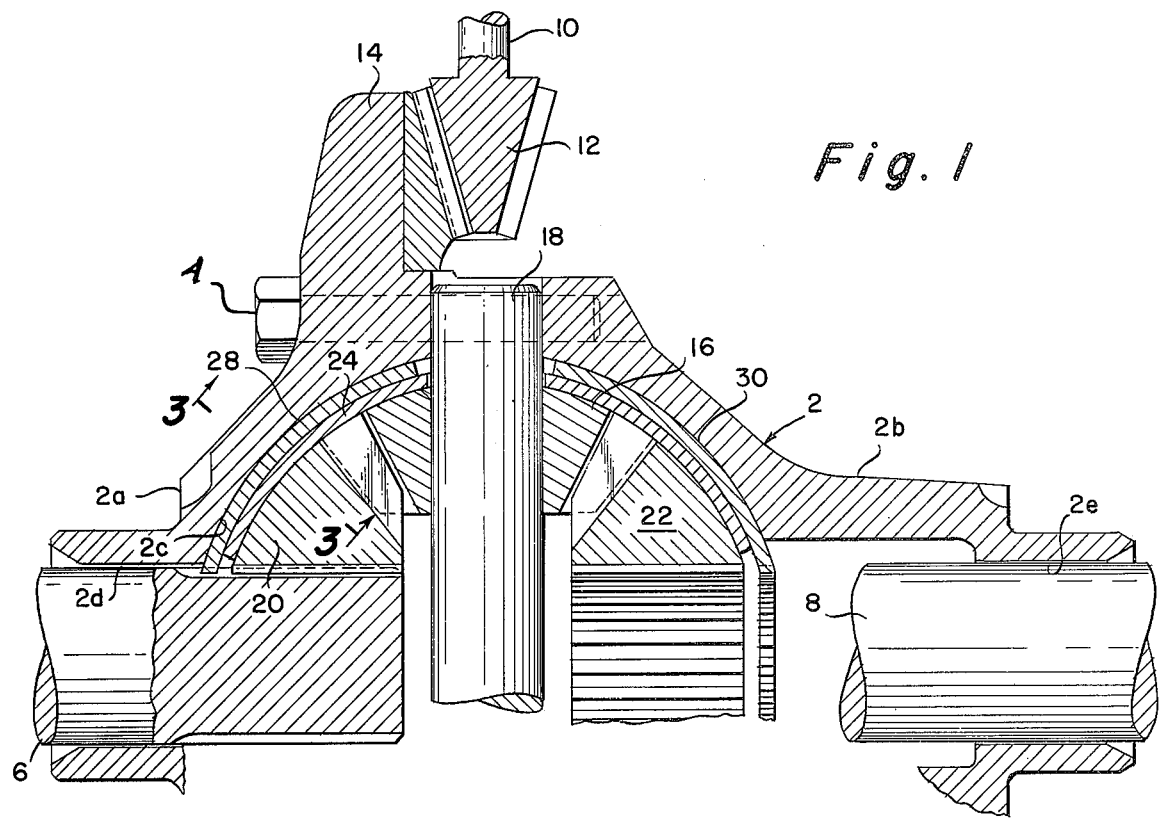

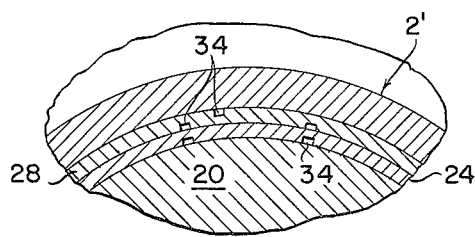
Fig. 3
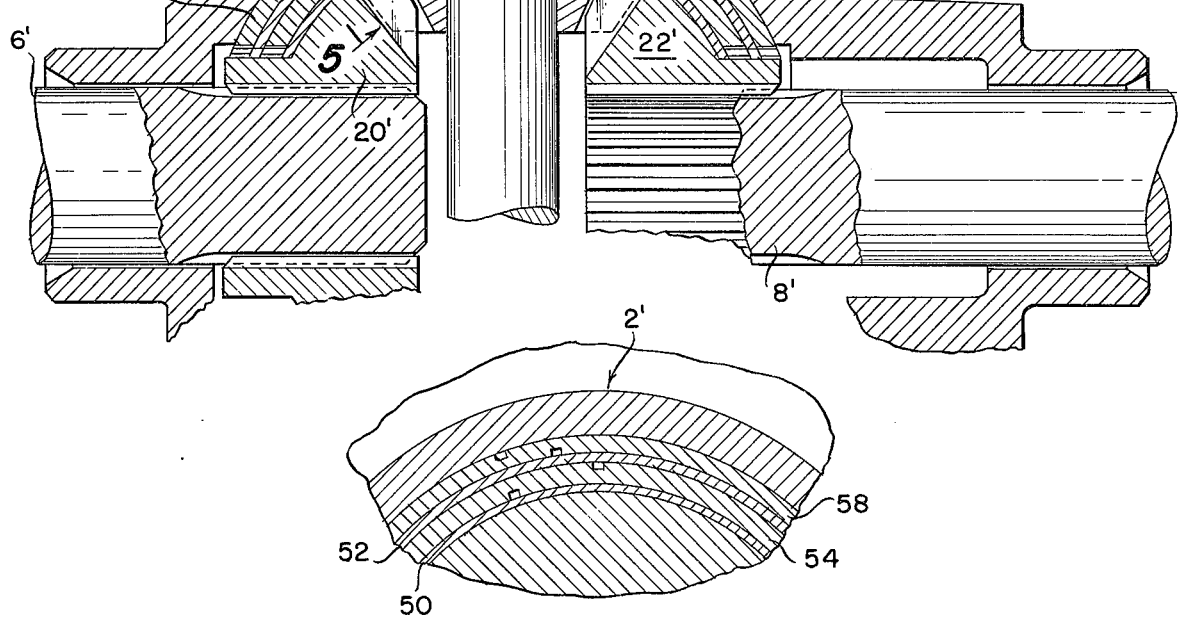
Fig. 4
Fig. 5

MULTI-SHELL LIMITED SLIP DIFFERENTIAL

STATEMENT OF THE INVENTION

This invention relates to a limited slip differential of the self-loading type including at least two concentric layers of pairs of generally semi-spherical shells for applying friction torque bias to the driven shafts via the side and planetary pinion gears of the differential gearing assembly.

DESCRIPTION OF THE PRIOR ART

Limited slip differentials are well known in the patented prior art, as evidenced by the patents to Ottemann U.S. Pat. No. 3,606,803 and Ferbitz et al U.S. Pat. No. 3,264,901, for example. Various differential and axle designs of the pre-loaded and self-loading types have been proposed for introducing a positive traction characteristic that will prevent overspinning of one traction wheel relative to the other. In one embodiment, friction clutch means are provided for clutching together one side gear and the differential carrier. In these instances, overspinning of one wheel with respect to the other cannot be accomplished unless the friction surfaces of the clutch are caused to slip. This introduces a torque bias which reduces the loss of tractive effort as one wheel encounters a road surface of low coefficient of friction. Other positive traction differential mechanisms employ cam elements which are engaged by relatively displaceable components of the differential assembly. These cam elements become actuated upon relative movement thereof with respect to the differential carrier, thus introducing a releasable mechanical torque delivery path between the ring gear and one of both of the axle shafts.

The present invention was developed to provide an improved differential mechanism of the self-loading type which avoids the use of friction torque clutches, cam-actuated lock-up devices, or spring preloading means.

SUMMARY OF THE INVENTION

In accordance with the present invention, a self-loading torque-responsive limited slip differential is provided which includes multi-shell means for applying friction torque bias to the driven shafts via the side and planetary pinion gears. The invention is characterized by the provision of at least two concentrically arranged layers of pairs of generally semi-spherical shells arranged concentrically in the space between the back surfaces of the side and planetary pinion gears of the differential gearing means and the wall surface of a chamber contained in the differential casing. To this end, the wall surface of the casing chamber is spherical and the back surfaces of the planetary pinion and the side gears comprise sectors of a sphere. The shells of a first shell pair are rotatably mounted in a free floating manner on the shafts of the planetary pinion gears, respectively, and the shells of the other shell pair — which are orthogonally arranged relative to the shells of the first pair — are non-rotatably connected with the driven shafts, respectively. In order to increase the friction torque bias, a plurality of additional pairs of concentric shell layers may be provided. The shells are compressed together as the side and planetary gears are displaced apart upon the application of load to the differential casing.

As distinguished from limited slip differentials of the preload type including clutch pack or spring loading means, the limited slip differential of the present invention is of the torque-responsive self-loading type (i.e., the friction torque bias, in pounds-feet, is a function of the driving or coasting torque applied to the differential casing). As is normal practice, the tooth geometry of the enmeshing teeth of the side and planetary pinion gears are designed to effect relative separation of these gears upon the application of torque to the differential casing, thereby effecting compression of the shells between the back surfaces of the side and pinion gears and the spherical wall surface of the casing chamber. Owing to the large frictional area between the mating surfaces, the multi-shell limited slip differential experiences low wear and an excellent heat transfer characteristic. The differential casing need not be hardened, thereby resulting in an important cost saving.

Boundary lubrication grooves are provided in the mating surfaces of the shells and/or the casing wall and the back surfaces of the side and planetary pinion gears for supplying boundary lubrication to said mating surfaces. The limited slip differential is compact enough to fit within existing axle housings, and the unit has no tendency to clunk when operable between drive and coast conditions. The bias is the same regardless of which rear wheel is spinning, thereby offering a further advantage over limited slip differentials of the single clutch pack type. Bias is immediate, without requiring initial or continued spinning of one wheel. In the two-layer design there is no limit on outward travel of the side gears, and consequently bias will not deteriorate with time. While the apparatus of the present invention lends itself best to differentials of the two-pinion type (rather than differentials of the four-pinion type), the shells of the four layer design are small enough that a plurality of shells can be fit in various layers, if desired. Thus, the apparatus of the present invention is particularly suitable for use in automobiles and light trucks.

OBJECT OF THE INVENTION

Accordingly, a primary object of the present invention is to provide a self-loading limited slip differential including at least a first pair of concentric layers of pairs of generally semi-spherical shells which are compressed, upon the application of torque to the differential casing, between the wall surface of the casing and the back surfaces of the side and planetary pinion gears, thereby to apply friction torque bias to the driven shafts via the side and planetary pinion gears. To this end, the wall surface of the casing chamber is spherical, and the back surfaces of the side and planetary pinion gears are formed as sectors of a sphere. The shell pairs of adjacent layers are orthogonally arranged, the shells of one layer being freely rotatably mounted upon the shafts of the planetary pinion gears, respectively, and the shells of the other layer being non-rotatably connected with the driven shafts, respectively (either directly or via non-rotatable connections with the side gears). The enmeshing teeth of the side and planetary gears have conventional geometry which cause these gears to be displaced apart upon the application of torque to the casing, thereby to achieve the desired compression of the shells.

In accordance with a more specific object of the invention, boundary lubrication grooves are formed in at least some of the mating surfaces of the shells, and, if desired, in the casing wall surface and the back surfaces of the side and pinion gears.

According to another object of the invention, the friction torque bias is increased by providing additional pairs of layers of shells in concentric relation to the first pair of shell layers. The pairs of shells of adjacent layers are orthogonally arranged, the open ends of the shells of each layer facing each other.

BRIEF DESCRIPTION OF THE DRAWINGS

Other objects and advantages of the invention will become apparent from a study of the following specification when viewed in the light of the accompanying drawing, in which:

FIG. 1 is a detailed sectional view of a two-layer embodiment of the limited slip differential of the present invention;

FIG. 2 is a perspective view of the apparatus of FIG. 1;

FIG. 3 is a detailed sectional view taken along the line 3—3 of FIG. 1;

FIG. 4 is a detailed sectional view of a four-layer embodiment of the present invention; and FIG. 5 is a sectional view taken along the line 5—5 of FIG. 4.

Referring now to the drawing, the limited slip differential includes a two-part casing 2 having casing sections 2a and 2b connected by bolts 4, said casing containing a chamber having a spherical wall surface 2c, and a pair of aligned bores 2d and 2e for receiving the aligned driven shafts 6 and 8, respectively. The casing is rotatably driven by the driving shaft 10 by a pinion gear 12 on the driving shaft and a ring gear 14 arranged concentrically upon the casing. The rotatable casing drives the output shafts via conventional differential gearing means including a pair of planetary pinions 16 (only one of which is shown) that are rotatably connected with the casing by pinion shaft 18, and a pair of side gears 20 and 22 that are splined to the output shafts 6 and 8, respectively, said side gears including gear teeth that enmesh with corresponding gear teeth on the pinions 16. The geometry of the enmeshing teeth is such that the side and planetary pinion gears are displaced apart upon the application of torque to the casing.

In accordance with the present invention, the planetary pinion and side gears include outer surfaces each of which is formed as a sector of a sphere, said outer surfaces being concentrically spaced from the corresponding spherical chamber wall surface 2c. Concentrically mounted within the space between these surfaces are inner and outer concentrically arranged layers of generally semi-spherical shells 24 and 26, and 28 and 30, respectively. As shown in FIG. 2, the shells of the inner and outer layers are orthogonally arranged, the open ends of the shells of each layer facing each other. The inner shells rotate freely in a floating manner about the pinion shaft 18, and the outer shells are splined to the output shafts 6 and 8, respectively. In order to effect boundary lubrication of the mating surfaces between the shells, between the inner shells and the back surfaces of the side and planetary pinion gears, and between the outer shells and the spherical casing wall, there are provided lubricating grooves 34 in at least some of these mating surfaces. These lubricating grooves may have various configurations as shown in FIG. 2.

OPERATION

Assuming that no driving torque is applied to the casing 2 via driving shaft 10, pinion 12 and ring gear 14, the layers of shells are not compressed together and the friction torque bias applied to the driven shafts via the back surfaces of the side and planetary pinion gears is quite low (i.e., substantially zero). Consequently, the driven shafts 6 and 8 are connected by the planetary pinions 16 and the side gears 20 and 22 for free conventional differential gearing operation. Rotation of one driven shaft in one direction results in rotation of the other driven shaft at the same speed in the opposite direction.

Upon the application of torque (driving or coasting) to the casing 2 via input shaft 10, pinion 12 and ring gear 14, the casing is rotated to drive the driven shafts 6 and 8 at the same rotational velocity via planetary pinions 16 and side gears 20 and 22, respectively. As the torque is increased, the tooth pressure angle between the enmeshing teeth of the side and planetary pinion gears causes these gears to be separated, thereby compressing the shells between the outer surfaces of the pinion and side gears and the spherical wall surface 2c of the casing chamber. This compression of the shells applies a friction torque bias to the driven shafts via the back surfaces of the side and planetary pinion gears. Thus, since shells 28 and 30 are splined to the driven shafts 6 and 8, the friction experienced by these shells puts torque bias into the driven shafts in addition to the frictional resistance experienced by the backs of the pinion and side gears. Consequently, in the event that the rear wheel associated with one of the driven shafts experiences a slip condition, torque is applied to the other driven shaft in accordance with the bias ratio. It is apparent that the limited slip differential is of the self-loading torque-responsive type, and the use of pre-load means is avoided.

Owing to the provision of the boundary lubrication grooves 34, boundary lubrication is applied to the mating surfaces of the shell, casing and gearing components (without obtaining a complete film on the mating surfaces) thereby reducing wear of the mating surfaces. Owing to the relatively large areas of the mating surfaces, the apparatus has excellent heat dissipating characteristics.

The semi-spherical shells are formed (for example, by lathe spinning) from a suitable metal such as hardened steel, brass, bronze or the like. If desired, the shells may be faced with a suitable friction material, such as an asbestos composition material like that used in brake linings.

The tooth geometry of the enmeshing teeth of the planetary pinion and the side gears may be altered to obtain a desired separating force derived from torque, thereby to control the amount of friction torque bias.

In order to increase the friction torque bias, the number of shells may be increased. Referring now to the embodiment of FIGS. 4 and 5, the back surfaces of the side gears 20' and 22' are reduced to enlarge the space between said surfaces and the spherical wall surface 2c' of the casing chamber. Four layers of concentrically arranged pairs of semi-spherical shells are provided in this enlarged space, the shells of one set of alternate layers (only shells 50 and 52 of which are shown) being rotatably mounted in free floating relation on the pinion shaft 18', and the shells 54, 56 and 58, 60 of the remaining layers being splined to the side gears 20' and 22', respectively.

The operation of this embodiment is identical to that of FIGS. 1 – 3. More particularly, in the absence of the application of torque to the differential casing, conventional differential connection (with relatively low friction torque bias) is achieved between shafts 6' and 8' via the side gears 20' and 22' and the planetary pinion gears 16. As the driving torque on ring gear 14' and casing 2' increases, the pinion and side gears are displaced apart (owing to the geometry of their enmeshing teeth) to compress the layers of shells together in a self-loading manner, thereby increasing the friction torque bias applied to the driven shafts via the back surfaces of the side and planetary pinion gears.

While in accordance with the provisions of the Patent Statutes, the preferred forms and embodiments of the invention have been illustrated and described, it will be apparent to those skilled in the art that various changes and modifications may be made without deviating from the inventive concepts set forth above.

What is claimed is:

1. A limited slip differential for driving a pair of axially aligned driven shafts by a driving shaft, including
   a. a casing containing a chamber having a spherical wall surface, said casing also including a pair of aligned bores communicating with said chamber for receiving the driven shafts, respectively;
   b. ring gear means adapted to be driven by the driving shaft for rotating said casing about the axis of said aligned bores;
   c. differential gearing means for connecting said casing with the driven shafts, respectively, said differential gearing means including
      1. at least two planetary pinion gears;
      2. a pair of pinion shaft means rotatably connecting said pinion gears with said casing, respectively; and
      3. a pair of side gears adapted for non-rotatable connection with said driven shafts, respectively, said side and planetary pinion gears having back surfaces which are formed as sectors of a sphere, said back surfaces being concentrically spaced from the spherical wall surface of said casing chamber, respectively, said planetary pinion and side gears having enmeshing teeth of a configuration to effect separation of said gears upon the application of torque to the differential casing; and
   d. at least two concentric layers of pairs of generally semi-spherical shells mounted in the space between the back surfaces of said side and planetary pinion gears and said chamber wall surface, the open ends of the shells of each layer facing each other and the shells of adjacent layers being orthogonally arranged, the shells of a first layer being rotatably mounted on the pinion shaft means associated with said pinion gears, respectively, and the shells of the other layer being adapted for non-rotatable connection with the driven shafts, respectively, whereby upon the application of torque to said casing, said side and planetary pinion gears are displaced apart to compress the shells between said back surfaces of said side and planetary pinion gears and said spherical casing wall surface, thereby to apply friction torque bias to the driven shafts via said side and planetary pinion gears.

2. Apparatus as defined in claim 1, wherein the shells of said second layer are non-rotatably connected with said side gears, respectively.

3. Apparatus as defined in claim 1, wherein at least some of the shells contain boundary lubricating grooves for supplying a lubricant between the mating surfaces of said shells.

4. Apparatus as defined in claim 2, wherein at least some of the mating surfaces between said shells and said spherical casing wall surface contain boundary lubricating grooves for supplying a lubricant to said mating surfaces.

5. Apparatus as defined in claim 4, wherein at least some of the mating surfaces between said shells and said side and planetary pinion gears contain boundary lubrication grooves for supplying a lubricant to said mating surfaces.

6. Apparatus as defined in claim 1, and further including at least two additional layers of pairs of semi-spherical shells arranged concentrically about said first two pairs of shells, the pairs of shells of a first group of alternate layers being rotatably connected with said pinion shaft means, respectively, and the shells of the remaining alternate layers being adapted for non-rotatable connection with said driven shafts, respectively.

7. Apparatus as defined in claim 6, wherein the shells of said remaining layers are non-rotatably connected with said side gears, respectively.

8. Apparatus as defined in claim 7, wherein the shells of said remaining alternate layers have a greater thickness than the shells of said first group of alternate layers.

* * * * *